(12) United States Patent
Levy et al.

(10) Patent No.: US 9,036,645 B2
(45) Date of Patent: *May 19, 2015

(54) TRAVERSING OF NAT ADDRESS TRANSLATION EQUIPMENT FOR SIGNALING MESSAGES COMPLIANT WITH SIP PROTOCOL

(75) Inventors: Thomas Levy, Paris (FR); Thomas Froment, Sur Orge (FR); Vincent Hiribarren, Linas (FR)

(73) Assignee: Alcatel Lucent, Boulogne-Billancourt (FR)

( * ) Notice: Subject to any disclaimer, the term of this patent is extended or adjusted under 35 U.S.C. 154(b) by 434 days.

This patent is subject to a terminal disclaimer.

(21) Appl. No.: 11/851,386

(22) Filed: Sep. 6, 2007

(65) Prior Publication Data

US 2008/0062993 A1 Mar. 13, 2008

(30) Foreign Application Priority Data

Sep. 8, 2006 (FR) ...................................... 06 53641

(51) Int. Cl.
| | |
|---|---|
| *H04L 12/66* | (2006.01) |
| *H04L 29/12* | (2006.01) |
| *H04L 29/06* | (2006.01) |
| *H04M 7/00* | (2006.01) |
| *H04M 7/12* | (2006.01) |

(52) U.S. Cl.
CPC .......... *H04L 29/12009* (2013.01); *H04L 29/06* (2013.01); *H04L 29/06027* (2013.01); *H04L 29/125* (2013.01); *H04L 29/12537* (2013.01); *H04L 61/2564* (2013.01); *H04L 61/2578* (2013.01); *H04M 7/0093* (2013.01); *H04M 7/123* (2013.01); *H04M 7/128* (2013.01); *H04L 65/1006* (2013.01)

(58) Field of Classification Search
USPC .......................................................... 370/401
See application file for complete search history.

(56) References Cited

U.S. PATENT DOCUMENTS

2004/0139228 A1* 7/2004 Takeda et al. ................. 709/245
2005/0135386 A1* 6/2005 Shores et al. ................. 370/401
(Continued)

OTHER PUBLICATIONS

Rosenberg Iab J.: "Considerations for Selection of Techniques for NAT Traversal" IETF Standard-Working-Draft, Internet Engineering Task Force, IETF, CH, Feb. 13, 2005, XP015038016.
(Continued)

*Primary Examiner* — Phirin Sam
*Assistant Examiner* — Tarell Hampton
(74) *Attorney, Agent, or Firm* — Harness, Dickey & Pierce, P.L.C.

(57) ABSTRACT

Method of setting up a communication session between a calling client ($C_1$) and a called client ($C_2$), through a communication network ($SN_1$, SN, $SN_2$) containing at least one address translation device ($NAT_1$, $NAT_2$). This method contains stages for the transmission of signaling messages (fs), passing through at least one address translation device and allowing the exchange of the physical addresses of the clients. At least one of the clients implements a solution for the traversing of address translation devices. The method is innovative in that at least one client adds, within the sent signaling messages, a parameter representing the implementation of the traversing solution and that, in the presence of such a parameter, the network devices do not implement their own solutions for the traversing of address translation devices.

24 Claims, 1 Drawing Sheet

(56) References Cited

U.S. PATENT DOCUMENTS

2005/0259637 A1    11/2005   Chu et al.
2007/0019619 A1*   1/2007   Foster et al. .................. 370/352
2007/0253418 A1*   11/2007   Shiri et al. .................... 370/392

OTHER PUBLICATIONS

Camarillo J Hautakorpi, et al.: "Functionality of Existing Session Border Controller (SBC)" IETF Standard-Working-Draft, Internet Engineering Task Force, IETF, CH, Feb. 14. 2005, XP015037667.

Rosenberg Cisco Systems J: "Interactive Connectivity Establishment (ICE): A Methodology for Network Address Translator (NAT) Traversal for Offer/Answer Protocols" IETF Standard-Working-Draft, Internet Engineering Task Force, IETF, CH, vol. mmusic, No. 10, Aug. 31, 2006, XP015046831.

* cited by examiner

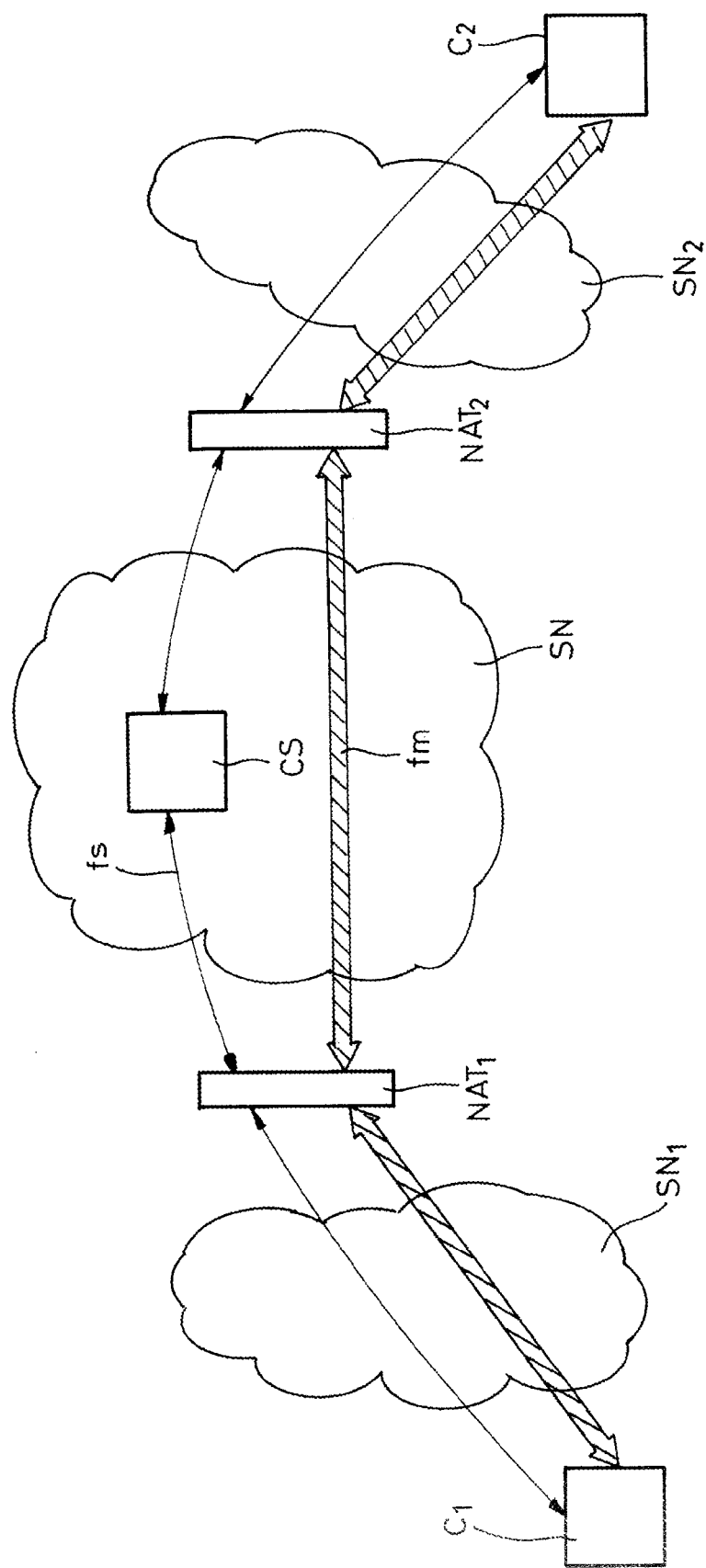

TRAVERSING OF NAT ADDRESS TRANSLATION EQUIPMENT FOR SIGNALING MESSAGES COMPLIANT WITH SIP PROTOCOL

This invention relates to communication networks. More specifically, it concerns the problem of the transmission of signaling messages through address translation devices such as "NATs".

Current communication networks allow a communication session to be set up using signaling protocols such as H.323, MGCP (Media Gateway Control Protocol) or SIP (Session Initiation Protocol) and SDP (Session Description Protocol).

This SIP protocol is defined by RFC 3261 of the IETF (Internet Engineering Task Force) and its dual aim is to allow:
- the connection between two parties,
- the negotiation of the characteristics of the session to be set up (video throughput, encoder (CODEC) to be used, etc.), via the SDP protocol.

A calling party wishing to call another party may address a signaling message ("Invite") to a signaling element, called a "Proxy", containing its personal address, the physical address of its terminal (or, more generally, a client, or a "user agent") and the personal address of the called party. The signaling element has the means ("registrar") to connect the personal address of the called party and the physical address of the corresponding terminal. Through this connection, the signaling message may be routed to the calling party.

If the calling party accepts the call, it then replies with new signaling messages containing the physical address of the terminal or client (or "user agent"). Therefore, since each of the two terminals knows the physical address of the other party, they may set up an IP (Internet Protocol) connection for the transmission of data (voice, video, etc.).

A problem arises however with address translation devices, known by the acronym NAT ("Network Address Translation") or NAPT ("Network Address Port Translation") and defined in RFC 1631, "The IP Network Address Translator", and in RFC 3022 "*Traditional IP Network Address Translator (Traditional NAT)*". These devices are intended to interface a sub-network (typically, a private network) with the public Internet network. The devices (terminals) of the sub-network have physical IP addresses for which the validity is limited to the sub-network. When it wishes to set up communication with devices located outside the sub-network, the address translation device assigns it a temporary public address, valid for the public network, and memorizes the association between the private address of the client and its temporary public address.

The NAT address translation device therefore modifies on the fly the messages transmitted between the private network and the public network, by
- converting the private addresses of the terminals to public addresses, in the IP headers of the outgoing messages, in other words those going from the private network to the public network, and by
- converting the public addresses of the terminals to private addresses, in the IP headers of incoming messages, in other words those going from the public network to the private network.

A problem therefore arises for the traversing of address translation devices by SIP/SDP (or H.323 or others) signaling messages. This problem is known as "NAT traversing".

It is for example described in the participative encyclopedia "Wikipedia" at the address: "http://en.wikipedia.org/wiki/NAT_traversing.html" and mentioned in RFC 3235 of the IETF, entitled "*Network Address Translation (NAT)—Friendly Application Design Guidelines*". It has also been set out in the IETF draft entitled "*Considerations for Selection of Techniques for NAT Traversing*" by J. Rosenberg, published in February 2005.

The signaling protocols, such as SIP and SDP, are considered to be application protocols. The SIP/SDP protocol, for example, may be transmitted by the TCP or UDP protocol, themselves located above IP in the protocol stack. A SIP message is therefore in fact a sequence of parameters encapsulated in a TCP or UDP message, itself encapsulated in an IP message.

The NAT address translation devices only modify the parameters located at IP layer level, leaving intact the parameters located in higher layers.

In other words, the physical addresses contained in the SIP and SDP messages are not modified by the address translation devices, unlike the addresses contained in the IP headers.

As a result, the recipient of the signaling message (the called client) will only know the private address of the calling client. However, since this is only meaningful in the private network, the communication session cannot be set up.

Since this problem is well known, many solutions have been proposed to resolve it. We may distinguish between two main approaches to resolve this problem: approaches based on the calling client and approaches based on a server or device of the communication network.

The first category includes the STUN ("Simple Traversing of UDP through NATs") mechanism, described in RFC 3489. This mechanism allows a client (or terminal) to find out its public address. Therefore, prior to the emission of a message to the public network, the calling client sends a request to a STUN server located in this public network. The server responds with a message containing the address (and the port) at which it "sees" the client, in other words its public address.

The client may then use this public address to indicate, via the SDP protocol, the address at which it wishes to receive replies.

This solution however suffers from a major limitation, since many NATs are said to be "symmetrical" and associate a public address with a pair of parties. Therefore, the public address assigned by the NAT to the client may be different for the communication with the STUN server and for the session to be set up with the other party. In such a case, the communication between the client and the other party cannot be set up.

Other proposals, based on the same principle, have been made to improve the situation, such as TURN ("Traversing Using Relay NAT") mechanisms. The TURN mechanism is described in the "draft-rosenberg-midcom-turn-09.txt" document, published in March 2006 on the IETF site.

However, neither the STUN mechanism nor the TURN mechanism is adapted to the SIP protocol.

A new mechanism, ICE ("Interactive Connectivity Establishment") has therefore been proposed to adapt the traversing of SIP signaling messages. It is based on an adaptation of the STUN and TURN mechanisms. The ICE mechanism is described in the "draft-ietf-mmusic-ice-10.txt" document, also published on the IETF site in August 2006 and entitled "*Interactive Connectivity Establishment: A Methodology for Network Address Translator (NAT) Traversing for Offer/Answer Protocol*".

The second category of solutions is based on devices inside the communication network. It should be noted that the first solutions implemented a server inside the network (STUN server, for example), but the initiative was that of the client. In this second group of solutions, however, the initiative and the implementation of the NAT traversing solutions belong to a network device.

A first solution belonging to this group is, for example, to associate an application gateway with the NAT address translation device. This mechanism is known as an ALG ("Application Layer Gateway" or "Application-level Gateway") and is defined in paragraph 2.9 of RFC 2663 entitled "*IP Network Address Translator (NAT) Terminology and Considerations*", published in August 1999.

This gateway (or a NAT with the features of such a gateway) has means of understanding application protocols used by the messages. It can in particular understand the content of the signaling messages and translate the physical addresses contained in the SDP messages so that the parties exchange their public addresses and not their private addresses, thereby allowing them to set up communication sessions.

A variant of this solution involves using a session controller known as SBC ("Session Border Controller"), which will be placed on the signaling message paths. This type of product is used to control the transmission of the communication sessions and the signaling messages between the two networks. More precisely, the SBC may play the role of a SIP "proxy" signaling element which can control the means of media transmission (a "media proxy") using a protocol such as Megaco so that the communication sessions are appropriately set up between the parties.

The IETF draft entitled "*Functionality of Existing Session Border Controller (SBC)*", published in February 2005, describes more explicitly the operation of an SBC session controller.

Further solutions exist in each of these large categories, without any one of them standing out definitively above the others.

A single communication network can thus simultaneously implement several solutions. A communication client does not a priori know whether the network with which it is associated implements a traversing solution: it may then implement an ICE type solution whereas the network implements an ALG or SBC type solution.

The deployment of two solutions is redundant and leads to the loss of resources, but furthermore the solutions may be mutually disruptive and lead to incorrect operation of the communication network: the addresses contained in the signaling messages may be modified incorrectly, or when it is not necessary, by the ALG or SBC device. Finally, the communication sessions cannot be set up.

This problem does not seem to have been resolved until now.

A solution that may be proposed would be to manually disable the mechanisms implemented by a SIP client (ICE, STUN, TURN, etc.) when this client known itself to be attached to an SBC or to an ALG gateway.

Such a process is however complex to implement: for a client to know that it is attached to an ALG gateway or to an SBC, it must know the topology of the network of its access provider. In addition, the configuration must be manually modified each time that the client is attached to a new network.

Furthermore, this approach is not optimal since once a solution based on an ALG gateway or an SBC is deployed it is, by construction, preferred to the solutions based on the client. However, it is this latter solution which is generally optimal since it allows the client to control the setting up of the communication session and does not implement a media relay like SBC or ALG solutions.

The aim of the invention is to overcome these disadvantages by proposing a method for the optimal coexistence of solutions based on the clients and solutions based on the communication network (ALG, SBC, etc.).

A first objective of the invention is a method of setting up a communication session between a calling communication client (or "user agent") and a called communication client, through a communication network containing at least one "NAT" address translation device.

The method includes stages for the transmission of signaling messages, passing through the address translation device and allowing the exchange of physical addresses of communication clients for setting up the communication session. At least one of the communication clients implements a solution for the traversing of address translation devices.

The method is characterized:
firstly by the fact that at least one of the communication clients adds, within at least one sent signaling message, a parameter representing the implementation of the address translation device traversing solution; and
secondly by the fact that, in the presence of such a parameter, the communication network device does not implement its own address translation device traversing solutions.

According to some embodiments of the invention, the signaling message sent complies with the SIP protocol. It may be an "Invite" message, but also other types of message ("Register", "Notify", etc.).

The parameter may be a header which complies with the SIP protocol, or a parameter which complies with the SDP protocol.

The device traversing solution may be a solution belonging to a group including the mechanisms STUN, ICE, TURN, etc.

The invention may also allow, in the absence of the parameter, for the communication network device to implement its own address translation device traversing solutions.

Furthermore, when a device of the communication network implements its own traversing solution, it may insert a parameter into the outgoing signaling message representing this implementation.

The invention also has the objective of a communication client with means of sending signaling messages for setting up a communication session with at least one other communication client, and means of traversing address translation devices.

The client according to the invention is innovative in the sense that it has the means, prior to the sending of a signaling message, to add within this message a parameter representing the implementation of these means of traversing address translation devices.

According to some embodiments of the invention, the signaling message sent complies with the SIP protocol. It may be an "Invite" message, but also other types of message ("Register", "Notify", etc.).

The parameter may be a header which complies with the SIP protocol, or a parameter which complies with the SDP protocol.

The device traversing solution may be a solution belonging to a group including the mechanisms STUN, ICE, TURN, etc.

The client according to the invention may also, when the means for traversing the address translation devices are unavailable, have the means for adding within the sent signaling message a parameter representing the non-implementation of the means of traversing address translation devices.

The invention also has the objective of a communication network allowing communication session(s) to be set up between a calling communication client and a called communication client and containing at least one network device. The network devices include at least one address translation device and the communication network also includes means for traversing address translation devices.

The communication network according to the invention is characterized by the fact that in the presence, within the signaling message received, of a parameter representing the implementation of means for the traversing of address translation devices by the communication client, the network devices do not implement their own means of traversing address translation devices.

According to some embodiments of the invention, the signaling message sent complies with the SIP protocol. It may be an "Invite" message, but also other types of message ("Register", "Notify", etc.).

The parameter may be a header which complies with the SIP protocol, or a parameter which complies with the SDP protocol.

The device traversing solution may be a solution belonging to a group including the mechanisms STUN, ICE, TURN, etc.

The communication network according to the invention may also be designed so that, in the absence of this parameter, the communication network devices implement their own address translation device traversing solutions.

It may also be envisaged that, when a device of the communication network implements its own traversing solution, it inserts a parameter into the outgoing signaling message, with this parameter representing this implementation.

The characteristics and the advantages of the invention will be clearer in the description which follows, together with the attached FIGURE.

This FIG. 1 shows in the form of a diagram an example of a communication network in which the invention may be implemented.

In this example of FIG. 1, the communication network is made up of 3 networks $SN_1$, $SN_2$ and SN, connected by two address translation devices, $NAT_1$ and $NAT_2$. This is a standard scenario in which each communication client, $C_1$ and $C_2$, is connected to a private sub-network, respectively $SN_1$ and $SN_2$. Each of these private sub-networks is connected to a public network SN using address translation devices, $NAT_1$ and $NAT_2$ respectively.

Other scenarios are possible, however. For example, a single NAT address translation device may be deployed between two private sub-networks belonging to two parties of a company. A situation may also be imagined in which one of the two clients is connected to a private sub-network without use of a NAT. In this case, a single NAT address translation device is deployed, between the other private sub-network and the public sub-network.

The communication network (mainly the SN public network) includes at least one device. These devices may be IP transmission nodes, such as routers, but also servers, signaling elements, SIP proxy, call servers, etc. On FIG. 1, for reasons of clarity, only the $NAT_1$ and $NAT_2$ address translation devices, along with a call server CS, have been shown. This call server CS is considered in what follows in its most general meaning, and therefore covers the "SIP proxy" elements, the "softswitches", the "call controllers", etc.

The setting up of a communication session forms part of the current state of the art, well known to professionals. Diagrammatically, it consists of the stages of the transmission of a signaling message between two communication clients, $C_1$ and $C_2$. This signaling flow fs is sent by the call server CS located in the public network SN. As mentioned previously, these transmissions of signaling messages allow the exchange of the physical addresses of the communication clients $C_1$ and $C_2$, and thereby allow the communication session fm to be set up between the two communication clients: the media flow (voice, data, video, etc.) fm may then be sent between the two clients using these exchanged physical addresses.

The signaling messages pass through the address translation devices $NAT_1$ and $NAT_2$. Therefore, each of the two communication clients $C_1$ and $C_2$ has (during a session) a public physical address assigned by the address translation device to which it is attached and different to its private physical address.

In order to be able to establish the communication session fm, the two clients must exchange their public physical addresses (and not their private physical addresses).

We assume in the example of FIG. 1 that the calling communication client $C_1$ implements an address translation device traversing solution ("NAT Traversing"). By the term "implement" it is understood that not only does the client possess means of traversing address translation devices, but that these means are enabled. A situation may in effect be imagined in which these means are disabled for various reasons (failure, manual deconfiguration as the user considers them to be under-performing, etc.).

These traversing means may be compliant with the various solutions available in the existing and future state of the art, which are based on the communication clients. The same mechanisms as mentioned previously, STUN, TURN or ICE, may be mentioned here.

Prior to the sending of a signaling message, the calling communication client $C_1$ adds to this message a parameter representing the fact that an address translation device traversing solution is implemented by the client $C_1$.

In the context of implementation using the SIP protocol, this signaling message is usually an "INVITE" message.

The signaling message, once sent, is transmitted to the address translation device $NAT_1$, then to other devices of the public network SN. If necessary, before reaching the address translation device $NAT_1$, it may also have passed through devices of the private sub-network $SN_1$.

Some of these devices may have means of traversing address translation devices. These means may be compliant with the solutions set forth previously: this may be an ALG gateway (Application Layer Gateway) or an SBC server (Session Border Controller).

In the presence of the parameter representing the implementation of the means of traversing the NAT (by the client $C_1$) in the message received, these network devices do not implement its own means of traversing the NAT.

In this way, it ensures that once a communication client implements a NAT traversing solution, no network devices implement their own solution. It therefore guarantees that one and only one solution is implemented for a given call.

This parameter added by the client to the signaling messages sent may be a header according to the SIP protocol. It may therefore take the form of a keyword followed by a value, such as the chain:

"X-Media-Processing: No-Processing"

The term "X-Media-Processing" is for indication purposes only. It may be any chain not yet used in the context of the SIP protocol and its extensions.

The value "No-Processing" is also indicative, and specifies that no processing must be carried out by the network devices (in other words no implementation of the means of traversing the NAT).

Alternatively, the parameter may be an SDP protocol (Session Description Protocol) parameter. It could then take the form of a keyword followed by a value, such as the chain:

"a=media-processing no-processing"

In the event that the means of traversing the address translation devices of the communication client $C_1$ are unavailable, it may:
- either not add a parameter representing the implementation of a NAT traversing solution in the signaling message sent,
- or add a parameter representing the non-implementation of the NAT traversing solution.

For the first option, for reasons of compatibility, the network device receiving a signaling message which does not contain a parameter representing the implementation of a NAT traversing solution behave in accordance with the state of the art. In other words, if they have means of traversing the NAT, they will implement them.

For the second case, this parameter may be similar to the first parameter.

It may for example be a SIP header which will use the same keyword as the first parameter. It may therefore be a chain with the form:

"X-Media-Processing: Processing-Required"

The "Processing-Required" chain is indicative and means that since no NAT traversing solution is deployed by the calling communication client $C_1$, a solution must be implemented by a communication network device.

This parameter may also be added as an SDP parameter, as explained previously.

A calling communication client may be required to add such a parameter, if it does not have means of traversing the NAT, or if it does possess such means but they are unavailable (STUN server failure, etc.) or because the user has chosen to disable them.

When a network device has implemented a NAT traversing solution, it may insert into the outgoing signaling message a parameter representing this implementation, so that any other device which may be located in the path of the signaling message does not also implement its own means of traversing the NAT.

This method of producing the invention resolves the additional problem which may be raised by the presence of several SBC servers or ALG gateways in a communication network.

This new parameter may be implemented in different ways. It may, for example, be a SIP header or an SDP parameter different to the one representing the implementation of a traversing solution by the client. It may also be the same SIP header or the same SDP parameter, in which case it takes a specific value.

In the event of an implementation using a SIP header, this parameter may take the form of the chain "X-Media-Processing: Processed", with the keyword "Processed" being arbitrary.

If the incoming signaling message contains a parameter (for example associated with the "Processing-Requested" value), its value is modified by the device to become "Processed" in the outgoing signaling message.

If the incoming signaling message does not contain a parameter, the message may add it to the outgoing signaling message.

The invention claimed is:

1. Method of setting up a communication session between a calling communication client and a called communication client, through a communication network including at least one address translation device, said method including signaling message transmission by at least one communication client, passing the signaling message through said at least one address translation device and allowing the exchange of the physical addresses of said communication clients for setting up said communication session, the method comprising:

implementing, by at least one of said communication clients, a client traversing solution;

adding, by said at least one communication client, a parameter representing the implementation of said client traversing solution within a signaling message to be sent, such that in the presence of the parameter, the at least one address translation device of said communication network does not implement its own traversing solution, the traversing solution of the at least one address translation device being different from the client traversing solution; and wherein the parameter is not an address.

2. Method of setting up a communication session according to claim 1, wherein said signaling message to be sent is a message which complies with an SIP protocol.

3. Method of setting up a communication session according to claim 2, wherein said signaling message to be sent is an "Invite" compliant message.

4. Method of setting up a communication session according to claim 1, wherein said client traversing solution complies with a mechanism taken within a group including at least one of STUN, TURN and ICE mechanisms.

5. Method of setting up a communication session according to claim 2, wherein said parameter is a header which complies with the SIP protocol.

6. Method of setting up a communication session according to claim 2, wherein said parameter is a parameter which complies with the SDP protocol.

7. Method of setting up a communication session according to claim 1, wherein in the absence of said parameter, the at least one address translation device implements a corresponding client traversing solution.

8. Method of setting up a communication session according to claim 7, wherein if the at least one address translation device of said communication network implements its own traversing solution, the at least one address translation device inserts a parameter into the outgoing signaling message, representing the corresponding implementation.

9. A communication client comprising:
a transmitter configured to send signaling messages for setting up a communication session with at least one other communication client; and
a client traversing solution unit configured to traverse at least one address translation device, such that prior to the sending of a signaling message, the client traversing solution unit adds within said signaling message a parameter representing an implementation of said traversal by the client traversing solution unit, and the parameter is not an address;
such that in the presence of the parameter, the at least one address translation device is configured to refrain from implementing a second client traversal that is different from said traversal.

10. Communication client according to claim 9, wherein said signaling message is a message which complies with an SIP protocol.

11. Communication client according to claim 10, wherein said signaling message is an "Invite" message.

12. Communication client according to claim 9, wherein said client traversing solution complies with a mechanism taken within a group including at least one of STUN, TURN and ICE mechanisms.

13. Communication client according to claim 10, wherein said parameter is a header which complies with the SIP protocol.

14. Communication client according to claim 10, wherein said parameter is a parameter which complies with the SDP protocol.

15. Communication client according to claim 9, wherein, if the traversal of the at least one address translation device is unavailable, the client traversing solution unit is further configured to add within said signaling message a parameter representing the non-implementation of said traversal.

16. Communication network for allowing the setting up of a communication session between a calling communication client and a called communication client, the communication network comprising:
 at least one network device including at least one address translation device; and
 a first client traversing solution unit for implementing a first client traversing solution for traversing said at least one address translation device,
 wherein said at least one network device is configured to refrain from implementing a second client traversing solution traversing said at least one address translation device in the presence of a parameter representing the implementation of the first client traversing solution by a communication client, within a received signaling message, and the parameter is not an address.

17. Communication network according to claim 16, wherein said received signaling message is a message which complies with an SIP protocol.

18. Communication network according to claim 17, wherein said received signaling message is an "Invite" message.

19. Communication network according to claim 16, wherein said traversing solution complies with a mechanism taken within a group including at least one of STUN, TURN and ICE mechanisms.

20. Communication network according to claim 17, wherein said parameter is a header which complies with the SIP protocol.

21. Communication network according to claim 17, wherein said parameter is a parameter which complies with the SDP protocol.

22. Communication network according to claim 17, wherein in the absence of said parameter, the at least one network device of said communication network implements the second client traversing solution for the traversing of at least one address translation device.

23. Communication network according to claim 22, wherein if a network device of said communication network implements a the first client traversing solution traversing solution, the network device inserts a parameter in the outgoing signaling message, representing the implementation of the first client traversing solution.

24. A non-transitory computer readable storage medium storing computer program instructions for implementing the method according to claim 1.

* * * * *